(12) United States Patent
Mitsuoka

(10) Patent No.: US 9,845,778 B2
(45) Date of Patent: Dec. 19, 2017

(54) CONTROL DEVICE FOR VEHICLE

(71) Applicant: Toyota Jidosha Kabushiki Kaisha, Toyota-shi Aichi-ken (JP)

(72) Inventor: Ryuhei Mitsuoka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 62 days.

(21) Appl. No.: 15/162,212

(22) Filed: May 23, 2016

(65) Prior Publication Data

US 2016/0348623 A1 Dec. 1, 2016

(30) Foreign Application Priority Data

May 27, 2015 (JP) ................. 2015-107400

(51) Int. Cl.
| | |
|---|---|
| F02D 41/30 | (2006.01) |
| F02M 37/00 | (2006.01) |
| F02M 51/04 | (2006.01) |
| B60W 10/06 | (2006.01) |
| F02M 69/04 | (2006.01) |
| F02D 41/38 | (2006.01) |
| F02M 37/22 | (2006.01) |

(52) U.S. Cl.
CPC ............ *F02M 51/04* (2013.01); *B60W 10/06* (2013.01); *F02D 41/3082* (2013.01); *F02D 41/3094* (2013.01); *F02D 41/3854* (2013.01); *F02M 37/0047* (2013.01); *F02M 37/0052* (2013.01); *F02M 69/046* (2013.01); *F02D 2041/3881* (2013.01); *F02D 2200/0602* (2013.01); *F02D 2250/31* (2013.01); *F02M 2037/226* (2013.01); *F02M 2200/09* (2013.01)

(58) Field of Classification Search
CPC ......... F02M 37/0052; F02M 2037/226; F02M 2200/09; F02D 41/3082; F02D 41/3094; F02D 41/3854; F02D 2200/0602; F02D 2250/31
USPC .......................... 123/457, 458, 511, 512, 514
See application file for complete search history.

(56) References Cited

U.S. PATENT DOCUMENTS 5,785,025 A * 7/1998 Yoshiume ............. F02D 33/003
123/458
7,373,924 B1 * 5/2008 Krengel .............. F02D 41/3005
123/457

(Continued)

FOREIGN PATENT DOCUMENTS

JP 2012-097640 A 5/2012
JP 2012-241676 A 12/2012

*Primary Examiner* — Erick Solis
(74) *Attorney, Agent, or Firm* — Dinsmore & Shohl LLP

(57) ABSTRACT

A vehicle includes a residual pressure holding valve provided downstream a feed pump of a fuel to hold a pressure in a fuel pipe leading to the port injection valve. Residual pressure holding valve is opened to return the fuel in the fuel pipe to the fuel tank when the pressure in the fuel pipe exceeds a valve opening pressure, and closed when the pressure in the fuel pipe is lower than the valve opening pressure. At the time of a request to reduce a target pressure of the fuel to be supplied to the electric feed pump, a control device refrains from causing the target pressure to decrease when a load of the engine is smaller than a prescribed value, and causes the target pressure to decrease when the load of the engine is greater than the prescribed value.

11 Claims, 8 Drawing Sheets

(56) References Cited

U.S. PATENT DOCUMENTS

| | | | | |
|---|---|---|---|---|
| 2005/0211224 A1* | 9/2005 | Inaguma | ............. | F02D 41/3845 |
| | | | | 123/458 |
| 2006/0118089 A1* | 6/2006 | Tokuo | ................. | F02D 41/3845 |
| | | | | 123/458 |
| 2006/0201485 A1* | 9/2006 | Usui | ....................... | F02D 41/20 |
| | | | | 123/458 |
| 2010/0274467 A1* | 10/2010 | Hayami | ............. | F02D 41/2438 |
| | | | | 701/103 |
| 2011/0162622 A1* | 7/2011 | Kojima | ................ | F02D 41/062 |
| | | | | 123/457 |
| 2014/0366845 A1* | 12/2014 | Kramer | .............. | F02D 41/3082 |
| | | | | 123/464 |
| 2015/0252764 A1* | 9/2015 | Cho | ....................... | F02M 59/20 |
| | | | | 123/496 |
| 2016/0076495 A1* | 3/2016 | Tagawa | ................. | F02M 37/08 |
| | | | | 123/458 |

\* cited by examiner

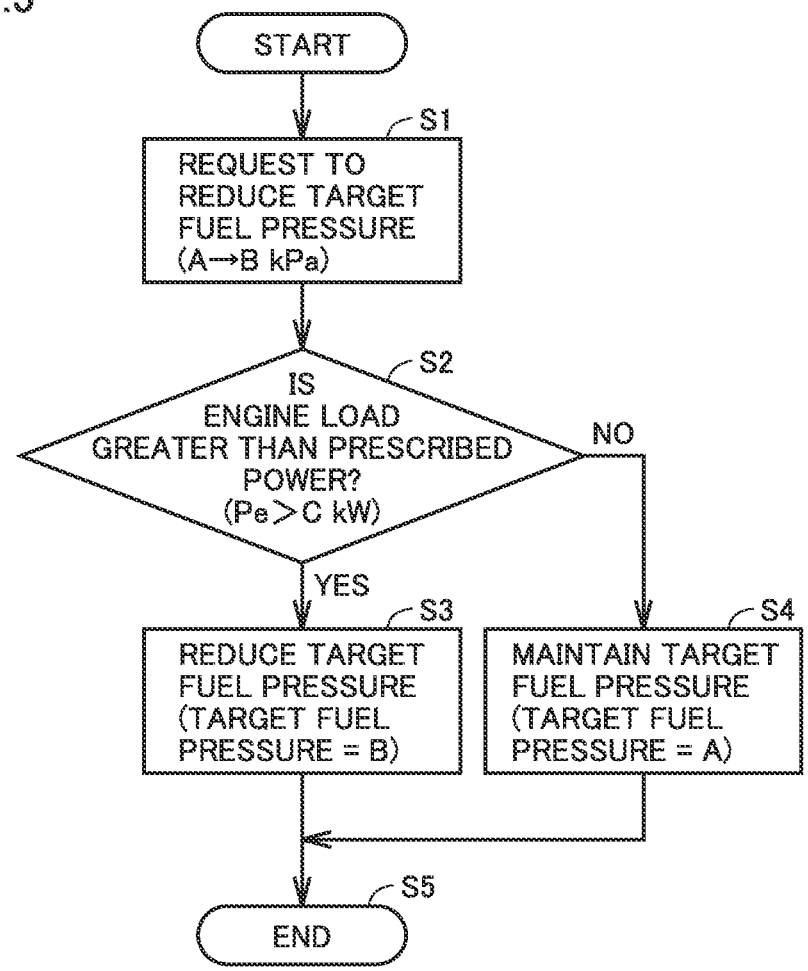

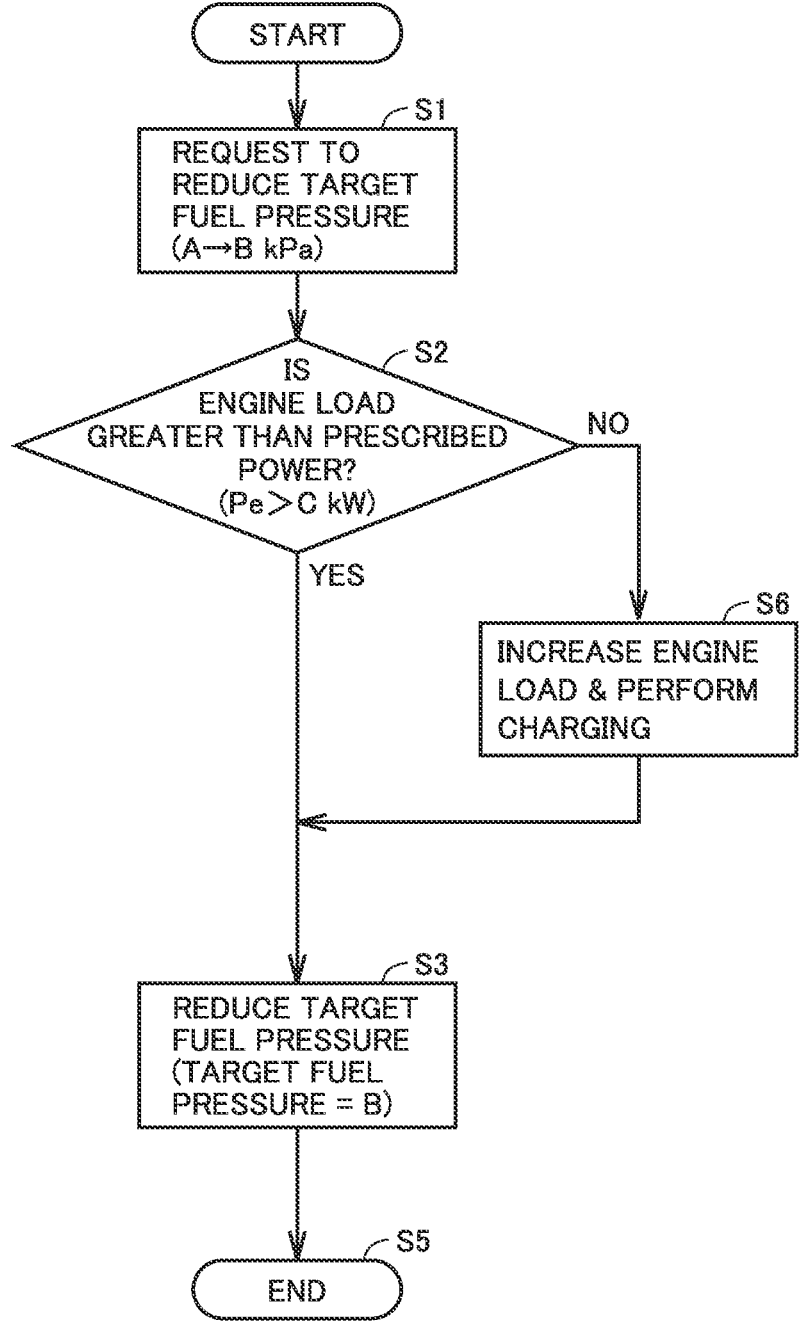

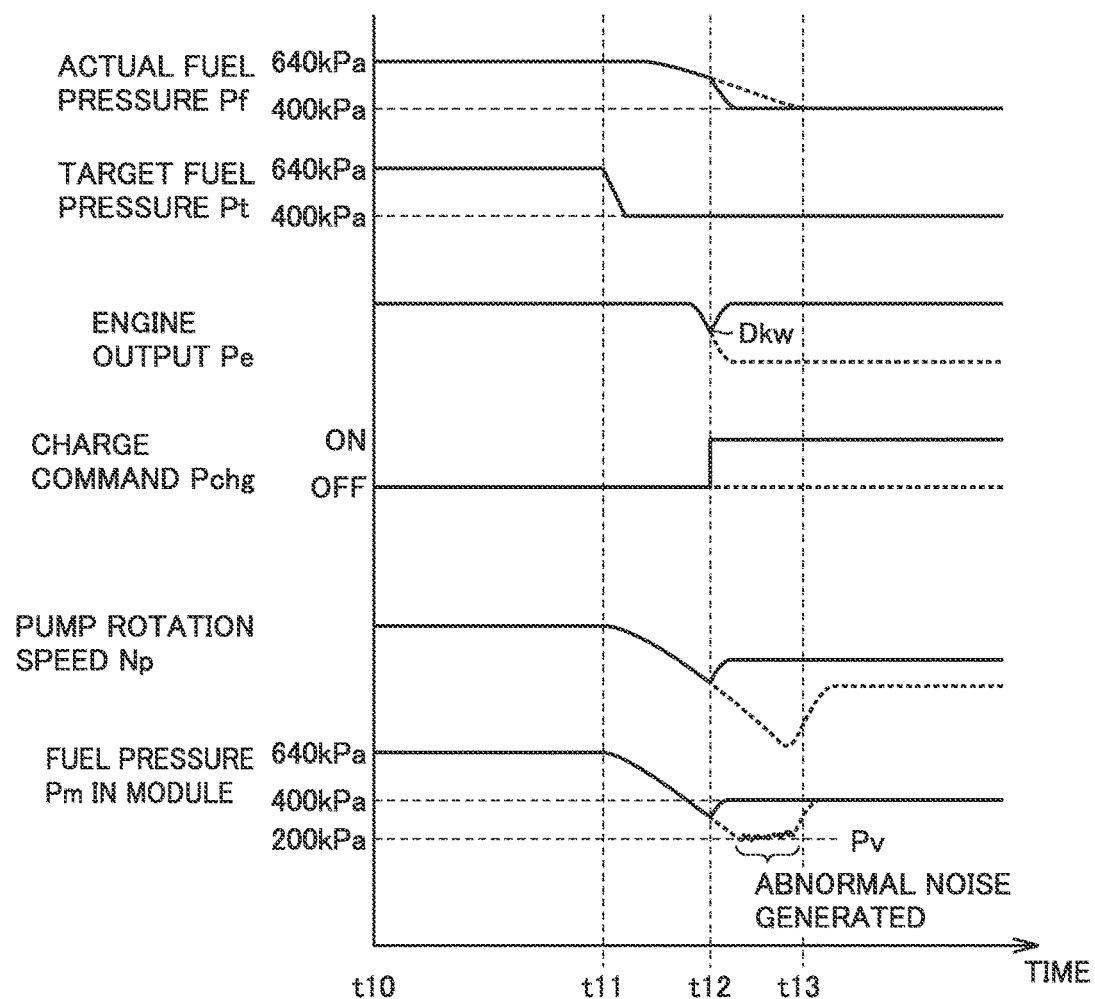

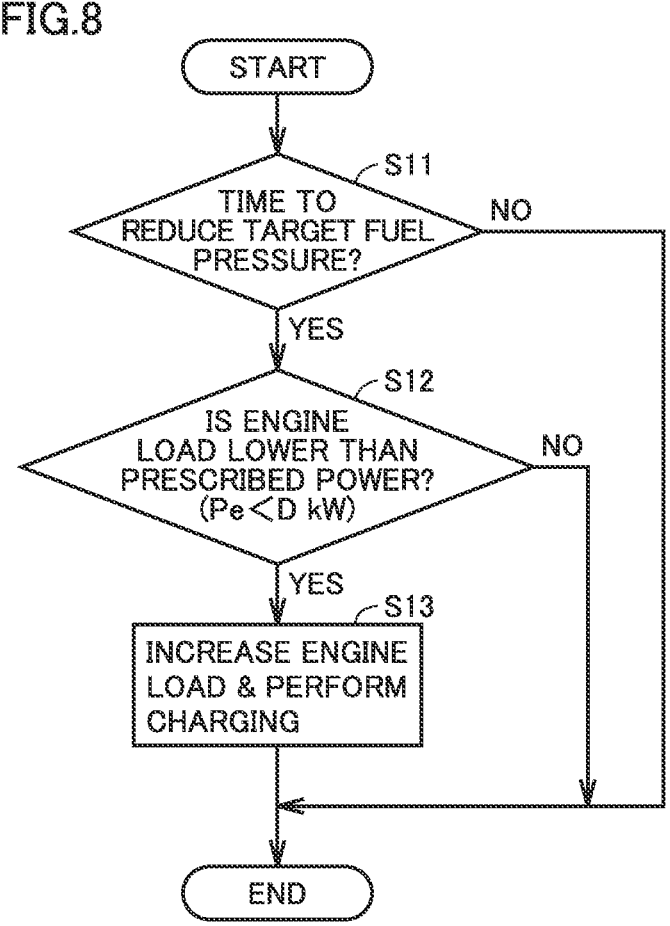

CONTROL DEVICE FOR VEHICLE

CROSS-REFERENCE TO RELATED APPLICATIONS

This nonprovisional application claims priority to Japanese Patent Application No. 2015-107400 filed on May 27, 2015 with the Japan Patent Office, the entire contents of which are hereby incorporated by reference.

BACKGROUND

Technical Field

The present disclosure relates to a control device for a vehicle, and particularly to a control device for a vehicle equipped with an internal combustion engine including a fuel injection valve.

Description of the Background Art

Japanese Patent Laying-Open No. 2012-097640 discloses a fuel supply device including a residual pressure holding valve that is disposed downstream a fuel feed pump to hold the pressure in a pipe for supplying a fuel to a fuel injection valve of an engine at a prescribed pressure during stoppage of the feed pump.

When the operation of the engine is stopped and the fuel feed pump is stopped, the residual pressure holding valve is closed to prevent the pressure in the fuel pipe from decreasing. When the residual pressure holding valve is closed, the fuel that has been discharged from the fuel pipe via the residual pressure holding valve to a fuel tank is stopped being discharged, and the pressure in the fuel pipe is maintained at the prescribed pressure.

In recent years, for improved fuel efficiency, an engine system configured to cause the fuel feed pump to operate in accordance with the state of an engine load has been considered. In such an engine system, an ECU sets a target pressure of the fuel to be supplied to the fuel injection valve (hereinafter, the pressure of the fuel may be referred to as the "fuel pressure", and the target pressure of the fuel as the "target fuel pressure"), and the fuel feed pump is operated to achieve the target fuel pressure.

In this engine system, when the target fuel pressure is reduced and the rotation of the fuel feed pump is set low, the residual pressure holding valve is closed to prevent the pressure in the fuel pipe from decreasing. When the residual pressure holding valve is closed, the fuel that has been discharged from the fuel pipe via the residual pressure holding valve to the fuel tank is stopped being discharged, and the pressure in the fuel pipe increases above a valve opening pressure of the residual pressure holding valve, which causes the residual pressure holding valve to open. This causes the pressure in the fuel pipe to decrease below the valve opening pressure of the residual pressure holding valve, which causes the residual pressure holding valve to close again. The residual pressure holding valve assumes only the two positions, i.e., open and closed positions, and does not assume a position such as a half-open position. Thus, if the pressure in the fuel pipe where the residual pressure holding valve is disposed remains around the valve opening pressure for a long time, the residual pressure holding valve is repeatedly opened and closed.

The repeated opening and closing of the residual pressure holding valve (with chattering being generated) is undesired in that this opening/closing noise may sound unpleasant to a passenger.

SUMMARY

An object of the present disclosure is to provide a control device for a vehicle in which noise generated by the residual pressure holding valve has been reduced.

In one aspect, the present disclosure relates to a control device for a vehicle. The vehicle includes an internal combustion engine having a fuel injection valve, a fuel tank that stores a fuel to be injected from the fuel injection valve, an electric feed pump that sucks the fuel from the fuel tank and supplies the fuel to the fuel injection valve, and a holding valve provided downstream the electric feed pump to hold a pressure in a fuel pipe leading to the fuel injection valve. The holding valve is configured to be opened to return the fuel in the fuel pipe to the fuel tank when the pressure in the fuel pipe exceeds a first prescribed value, and to be closed when the pressure in the fuel pipe is lower than the first prescribed value. At the time of a request to reduce a target pressure of the fuel to be supplied to the electric feed pump, when a load of the internal combustion engine is small, the control device is configured to make a reduction width of the target pressure smaller than a reduction width of the target pressure when the load of the internal combustion engine is great.

When the load of the internal combustion engine is smaller than a prescribed value, the amount of the fuel injected from the fuel injection valve is small. In an extreme case, when the load of the internal combustion engine is zero, the fuel pressure near the fuel injection valve is unlikely to decrease. Thus, at the time of a request to reduce the fuel pressure, if the rotation speed of the electric feed pump is reduced in response to this request, the fuel pressure around the holding valve may decrease prior to the fuel pressure around the fuel injection valve decreases. It is thus possible that the fuel pressure near the holding valve may cross a valve opening pressure of the holding valve before the fuel pressure around the injection valve decreases to the target fuel pressure. Depending on the rotation speed of the electric feed pump, the fuel pressure around the holding valve may reach equilibrium near the valve opening pressure, causing the holding valve to be repeatedly opened and closed. Thus, when the load of the internal combustion engine is small as described above, the reduction width of the target pressure is made smaller than that when the load of the internal combustion engine is great, in order to prevent the repeated opening and closing of the holding valve.

Preferably, the control device is configured to refrain from causing the target pressure to decrease when the load of the internal combustion engine is smaller than a second prescribed value, and cause the target pressure to decrease when the load of the internal combustion engine is greater than the second prescribed value to thereby reduce the reduction width of the target pressure.

More preferably, the vehicle further includes a power storage device and a power generator. At the time of a request to reduce a target pressure of the fuel to be supplied to the electric feed pump, when the load of the internal combustion engine is smaller than the second prescribed value, the control device is configured to increase the load of the internal combustion engine by causing power generated by the power generator driven with the internal combustion engine to be charged into the power storage device.

Through the control as described above, when the load of the internal combustion engine is smaller than the prescribed value, even at the time of the request to reduce the target fuel pressure, it is possible to reduce the target pressure as requested while avoiding generation of noise from the holding valve, by increasing the load of the internal combustion engine without affecting running of the vehicle.

In some embodiments, the vehicle further includes a first check valve provided between the holding valve and the electric feed pump in the fuel pipe. The holding valve is configured to be closed when injection of the fuel from the fuel injection valve is stopped and operation of the electric feed pump is stopped, to hold a pressure downstream the first check valve around the first prescribed value.

With this structure including the first check valve, when the fuel injection is stopped and the electric feed pump is stopped, the holding valve is closed to allow the pressure in the fuel pipe to be held near the first prescribed value.

In some embodiments, the vehicle further includes a second check valve provided between the fuel injection valve and the holding valve. The second check valve is configured to be opened when a pressure in the vicinity of the holding valve is higher than a pressure in the vicinity of the fuel injection valve, and to be closed when the pressure in the vicinity of the holding valve is lower than the pressure in the vicinity of the fuel injection valve.

Through this operation of the second check valve, the engine can be shut down with the pressure in the fuel pipe downstream the second check valve being held higher than the valve opening pressure of the holding valve. This allows the fuel pressure to be increased rapidly at the time of restarting the engine operation after temporary shutdown of the engine.

In another aspect, the present disclosure relates to a control device for a vehicle. The vehicle includes an internal combustion engine having a fuel injection valve, a fuel tank that stores a fuel to be injected from the fuel injection valve, an electric feed pump that sucks the fuel from the fuel tank and supplies the fuel to the fuel injection valve, and a holding valve provided downstream the electric feed pump to hold a pressure in a fuel pipe leading to the fuel injection valve. The holding valve is configured to be opened to return the fuel in the fuel pipe to the fuel tank when the pressure in the fuel pipe exceeds a first prescribed value, and to be closed when the pressure in the fuel pipe is lower than the first prescribed value. At the time of a request for reducing a target pressure of the fuel to be supplied to the electric feed pump, when a load of the internal combustion engine is smaller than a third prescribed value, the control device is configured to reduce the target pressure while performing processing of increasing the load of the internal combustion engine.

Through the control as described above, when the load of the internal combustion engine is smaller than the third prescribed value, even at the time of a request to reduce the target pressure, it is possible to reduce the target pressure as requested while avoiding generation of noise from the holding valve, by increasing the load of the internal combustion engine without affecting running of the vehicle.

According to the present disclosure, it is possible to avoid generation of noise from the holding valve when reducing the target fuel pressure.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 5 is a flowchart for use in illustrating control executed by control device 100 in a first embodiment.

FIG. 6 is a flowchart for use in illustrating control executed by engine ECU 141 in a second embodiment.

FIG. 7 is an operation waveform diagram for use in illustrating operation in a third embodiment.

FIG. 8 is a flowchart for use in illustrating control executed by control device 100 in the third embodiment.

DESCRIPTION OF THE EMBODIMENTS

Embodiments of the present disclosure will be described below in detail with reference to the drawings, in which the same or corresponding elements are indicated by the same reference signs, and description thereof will not be repeated.

(Description of Basic Configuration)

Figure 1:
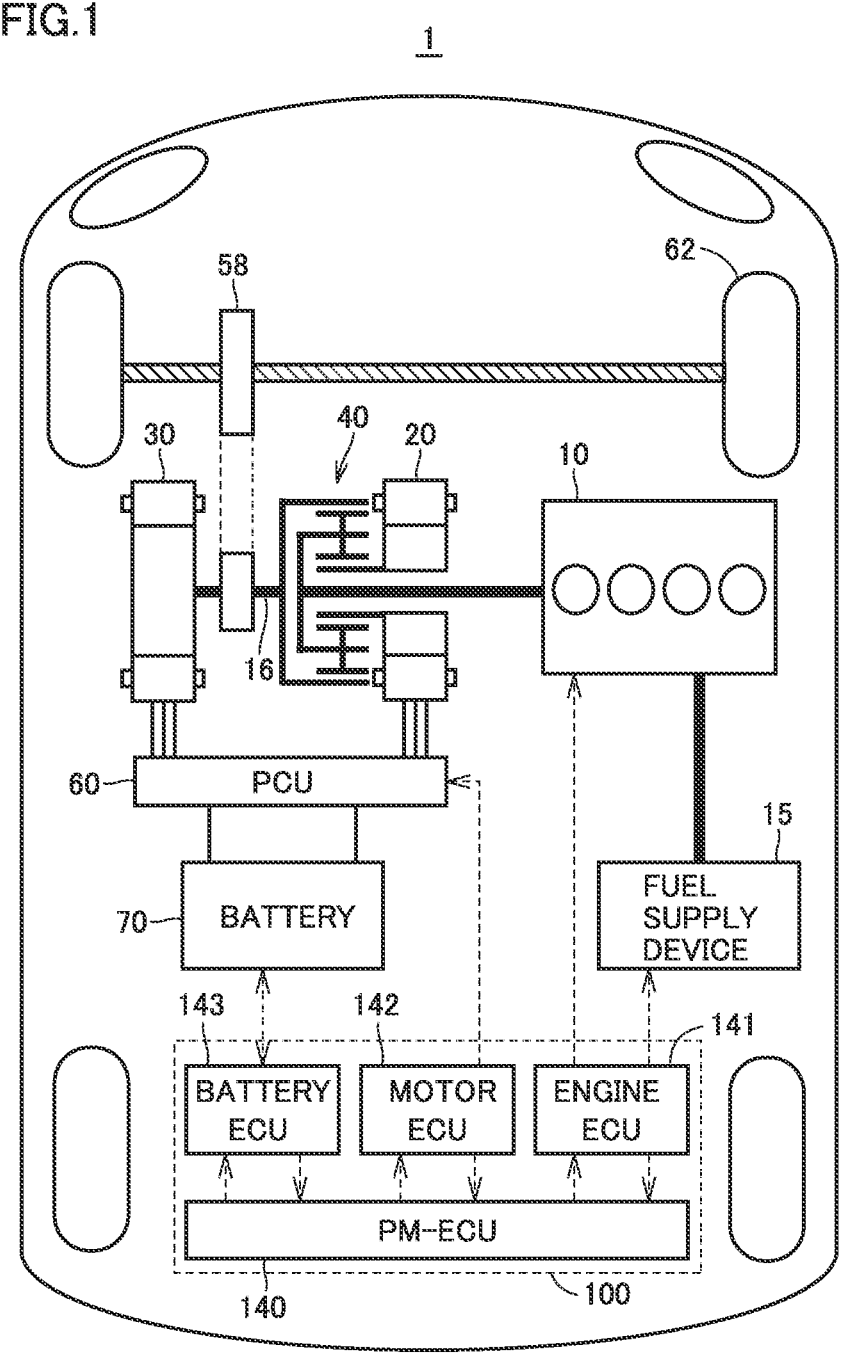
FIG. 1 is a block diagram showing the configuration of a hybrid vehicle 1 to which the present disclosure is applied.

FIG. 1 is a block diagram showing the configuration of a hybrid vehicle 1 to which the present invention is applied. Referring to FIG. 1, hybrid vehicle 1 includes an engine 10, a fuel supply device 15, motor generators 20 and 30, a power split device 40, a reduction mechanism 58, a driving wheel 62, a power control unit (PCU) 60, a battery 70, and a control device 100. Note that engine 10 corresponds to the "internal combustion engine", motor generator 20 corresponds to the "power generator", battery 70 corresponds to the "power storage device", and control device 100 corresponds to the "control device", in the claims.

Hybrid vehicle 1 is a series/parallel-type hybrid vehicle, and is configured to be capable of running using at least one of engine 10 and motor generator 30 as a driving source.

Engine 10, motor generator 20, and motor generator 30 are coupled to one another via power split device 40. Reduction mechanism 58 is connected to a rotation shaft 16 of motor generator 30, which is coupled to power split device 40. Rotation shaft 16 is coupled to driving wheel 62 via reduction mechanism 58, and is coupled to a crankshaft of engine 10 via power split device 40.

Power split device 40 is capable of splitting the driving force of engine 10 for motor generator 20 and rotation shaft 16. Motor generator 20 can function as a starter for starting engine 10 by rotating the crankshaft of engine 10 via power split device 40.

Motor generators 20 and 30 are both well-known synchronous generator motors that can operate both as power generators and electric motors. Motor generators 20 and 30 are connected to PCU 60, which in turn is connected to battery 70.

Control device 100 includes an electronic control unit for power management (hereinafter referred to as "PM-ECU") 140, an electronic control unit for the engine (hereinafter referred to as "engine ECU") 141, an electronic control unit for the motors (hereinafter referred to as "motor ECU") 142, and an electronic control unit for the battery (hereinafter referred to as "battery ECU") 143.

PM-ECU 140 is connected to engine ECU 141, motor ECU 142, and battery ECU 143, via a communication port (not shown). PM-ECU 140 exchanges various control signals and data with engine ECU 141, motor ECU 142, and battery ECU 143.

Motor ECU 142 is connected to PCU 60 to control driving of motor generators 20 and 30. Battery ECU 143 calculates a remaining capacitance (hereinafter referred to as SOC (State of Charge)), based on an integrated value of charge/discharge current of battery 70.

Engine ECU 141 is connected to engine 10 and fuel supply device 15. Engine ECU 141 receives input of signals from various sensors that detect operation conditions of engine 10, and performs operation control such as fuel injection control, ignition control, intake air amount regulation control, or the like, in accordance with the input signals. Engine ECU 141 also controls fuel supply device 15 to supply a fuel to engine 10.

In hybrid vehicle 1 having the above-described configuration, the configuration and control of engine 10 and fuel supply device 15 will be described in more detail.

Figure 2:
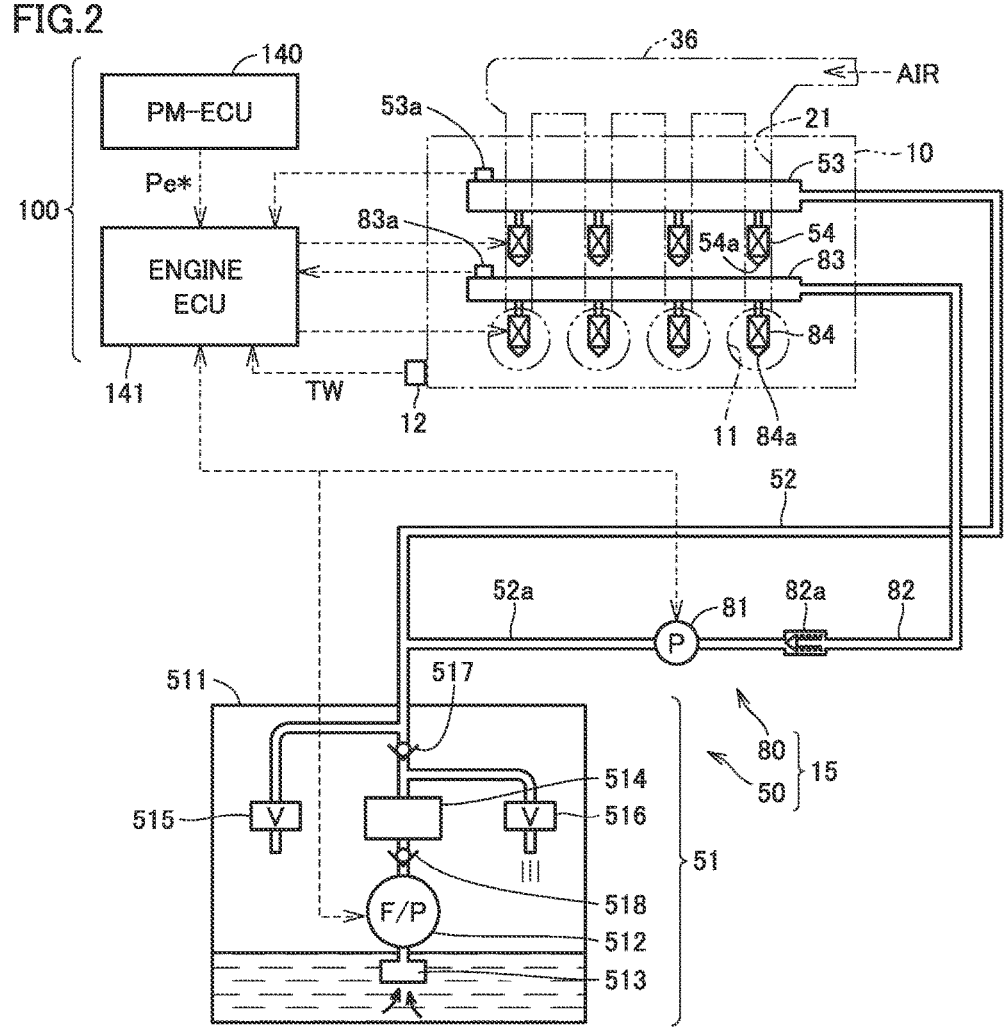
FIG. 2 is a diagram showing the configuration of engine 10 and fuel supply device 15 concerning fuel supply.

FIG. 2 is a diagram showing the configuration of engine 10 and fuel supply device 15 concerning fuel supply. In this embodiment, the vehicle to which the invention is applied is a hybrid vehicle that adopts, as an internal combustion engine, a dual injection-type internal combustion engine using both in-cylinder injection and port injection, for example, a serial four-cylinder gasoline engine.

Referring to FIG. 2, engine 10 includes an intake manifold 36, an intake port 21, four cylinders 11 provided in a cylinder block, and a water temperature sensor 12 that detects a temperature of a coolant for cooling the cylinder block of engine 10.

When a piston (not shown) is lowered in each cylinder 11, intake air AIR flows into each cylinder 11 from an intake port pipe through intake manifold 36 and intake port 21.

Fuel supply device 15 includes a low-pressure fuel supply mechanism 50 and a high-pressure fuel supply mechanism 80. Low-pressure fuel supply mechanism 50 includes a fuel pumping section 51, a low-pressure fuel pipe 52, a low-pressure delivery pipe 53, a low-pressure fuel sensor 53a, and port injection valves 54. Note that port injection valve 54 corresponds to the "fuel injection valve" in the claims.

High-pressure fuel supply mechanism 80 includes a high-pressure pump 81, a check valve 82a, a high-pressure fuel pipe 82, a high-pressure delivery pipe 83, a high fuel-pressure sensor 83a, and in-cylinder injection valves 84.

Each in-cylinder injection valve 84 is an injector for in-cylinder injection having an injection nozzle hole 84a exposed within the combustion chamber of each cylinder 11. During a valve-opening operation of each in-cylinder injection valve 84, fuel pressurized within high-pressure delivery pipe 83 is injected into the combustion chamber from nozzle hole 84a of in-cylinder injection valve 84.

Engine ECU 141 is configured to include a CPU (Central Processing Unit), a ROM (Read Only Memory), a RAM (Random Access Memory), an input interface circuit, an output interface circuit, and the like. Engine ECU 141 controls engine 10 and fuel supply device 15 in response to an engine start/shutdown command from PM-ECU shown in FIG. 1.

Engine ECU 141 calculates an amount of fuel to be injected required for every combustion cycle based on the accelerator pedal position, the intake air amount, the engine speed, and the like. Engine ECU 141 also outputs an injection command signal or the like to each port injection valve 54 and each in-cylinder injection valve 84, at an appropriate time, based on the calculated amount of fuel to be injected.

At the start of engine 10, engine ECU 141 causes port injection valves 54 to perform fuel injection first. ECU 140 then begins to output an injection command signal to in-cylinder injection valves 84 when the fuel pressure in high-pressure delivery pipe 83 detected by high fuel-pressure sensor 83a has exceeded a preset pressure value.

Furthermore, while engine ECU 141 basically uses, for example, in-cylinder injection from in-cylinder injection valves 84, it also uses port injection under a specific operation state in which an air-fuel mixture is not sufficiently formed using in-cylinder injection, for example, during the start and the warm-up of engine 10, or during rotation of engine 10 at low speed and high load. Alternatively, while engine ECU 141 basically uses, for example, in-cylinder injection from in-cylinder injection valves 84, it also causes port injection from port injection valves 54 to be performed when port injection is effective, for example, during rotation of engine 10 at high speed and high load.

In this embodiment, fuel supply device 15 has a feature in that the pressure of low-pressure fuel supply mechanism 50 is variably controllable. Low-pressure fuel supply mechanism 50 of fuel supply device 15 will be described below in more detail.

Fuel pumping section 51 includes a fuel tank 511, an electric feed pump 512, a suction filter 513, a fuel filter module 514, a relief valve 515, check valves 517, 518, and a residual pressure holding valve 516. Residual pressure holding valve 516 corresponds to the "holding valve", check valve 518 corresponds to the "first check valve", check valve 517 corresponds to the "second check valve", fuel tank 511 corresponds to the "fuel tank", and feed pump 512 corresponds to the "electric feed pump", in the claims.

Fuel tank 511 stores a fuel consumed by engine 10, for example, gasoline. Suction filter 513 prevents suction of foreign matter. Fuel filter module 514 removes foreign matter contained in discharged fuel.

Relief valve 515 is opened when the pressure of the fuel discharged from feed pump 512 reaches an upper limit pressure, and remains closed while the pressure of the fuel is below the upper limit pressure.

Low-pressure fuel pipe 52 connects from fuel pumping section 51 to low-pressure delivery pipe 53. Note, however, that low-pressure fuel pipe 52 is not limited to a fuel pipe, and may also be a single member through which a fuel passage is formed, or may be a plurality of members having a fuel passage formed therebetween.

Low-pressure delivery pipe 53 is connected to low-pressure fuel pipe 52 on one end thereof in a direction of the arrangement of cylinders 11 in series. Port injection valves 54 are connected to low-pressure delivery pipe 53. Low-pressure delivery pipe 53 is equipped with low-pressure fuel sensor 53a that detects an internal fuel pressure.

Each port injection valve 54 is an injector for port injection having an injection nozzle hole 54a exposed within intake port 21 corresponding to each cylinder 11. During a valve-opening operation of each port injection valve 54, fuel pressurized within low-pressure delivery pipe 53 is injected into intake port 21 from nozzle hole 54a of port injection valve 54.

Feed pump 512 is driven or stopped in accordance with a command signal sent from engine ECU 141. This command signal is generated by control device 100 such that a detected value of low-pressure fuel sensor 53a corresponds to a target fuel pressure Pt.

Feed pump 512 is capable of pumping up fuel from fuel tank 511, and pressurizing the fuel to a pressure in a certain variable range of less than 1 [MPa: megapascal], for example, and discharging the fuel. Feed pump 512 is also capable of changing the amount of discharge [$m^3$/sec] and the discharge pressure [kPa: kilopascal] per unit time, under the control of engine ECU 141.

This control of feed pump 512 is preferable in the following respects. Firstly, in order to prevent evaporation of the fuel inside low-pressure delivery pipe 53 when the engine is heated to a high temperature, it is necessary to apply a pressure to low-pressure delivery pipe 53 beforehand such that the fuel does not evaporate. An excessive pressure, however, will cause a great load on the pump, leading to a large energy loss. Since the pressure for preventing evaporation of the fuel changes depending on the temperature, energy loss can be reduced by applying a required pressure to low-pressure delivery pipe 53. Secondly, consumption of waste energy for pressurizing the fuel can be saved by controlling feed pump 512 appropriately to deliver an amount of fuel corresponding to an amount of fuel consumed by the engine.

This is advantageous in that the fuel efficiency is improved compared to a configuration in which the fuel is excessively pressurized and then the fuel pressure is adjusted to be constant with a pressure regulator.

[Operation of Residual Pressure Holding Valve and Problem when Target Fuel Pressure is Reduced]

Check valve 518 is disposed between feed pump 512 and a portion where residual pressure holding valve 516 is mounted, in the fuel pipe. Check valve 517 is provided between the portion where residual pressure holding valve 516 is mounted and a portion where relief valve 515 is mounted, in the fuel pipe. When the injection from port injection valves 54 and in-cylinder injection valves 84 is stopped, and when the operation of feed pump 512 is stopped, residual pressure holding valve 516 is closed to allow the pressure in the fuel pipe downstream residual pressure holding valve 516 to be held near the valve opening pressure.

When the engine is temporarily shut down and the fuel injection is stopped, even though feed pump 512 is stopped, check valve 518 serves to prevent a decrease in pressure around fuel filter module 514 of the fuel pipe. If this pressure is higher than the valve opening pressure of residual pressure holding valve 516, residual pressure holding valve 516 is open to reduce the pressure. If this pressure is near the valve opening pressure of residual pressure holding valve 516, residual pressure holding valve 516 is closed to hold the pressure near the valve opening pressure.

Because residual pressure holding valve 516 serves to keep the pressure in the fuel pipe near the valve opening pressure, when feed pump 512 is started at the time of restarting the engine after the temporary shutdown of the engine, the pressure in the fuel pipe can be increased fast.

Note, however, that the pressure in the fuel pipe varies depending on the balance between the amount of fuel supplied from feed pump 512 and the amount of fuel injected from port injection valves 54 and in-cylinder injection valves 84. During normal operation, therefore, the rotation speed of feed pump 512 is controlled to be high when the engine load is high and the amount of injected fuel is large. Further, during normal operation, the rotation speed of feed pump 512 is controlled to be low when the engine load is low and the amount of injected fuel is small.

In an engine system having a structure including residual pressure holding valve 516 as described above, a request to reduce the target fuel pressure may be issued.

For example, in order to check the operation of low-pressure fuel sensor 53a, the target fuel pressure is set to increase the fuel pressure to a value (about 640 kPa) higher than that during normal use. After it is detected by low-pressure fuel sensor 53a that an actual fuel pressure Pf matches target fuel pressure Pt, a request to reduce target fuel pressure Pt to a value (about 400 kPa) during normal use is issued.

Moreover, for example, when the engine is shut down after operation of the engine, if the fuel staying in the fuel pipe evaporates by being heated to a high temperature due to exhaust heat, the amount of injected fuel decreases. In order to prevent this, a request to increase the target fuel pressure may be issued at engine start. In that case, the fuel having a low temperature is supplied into the fuel pipe from the fuel tank after the engine start to thereby avoid the problem of evaporation of the fuel. Then, a request to reduce the target fuel pressure is issued.

Figure 3:
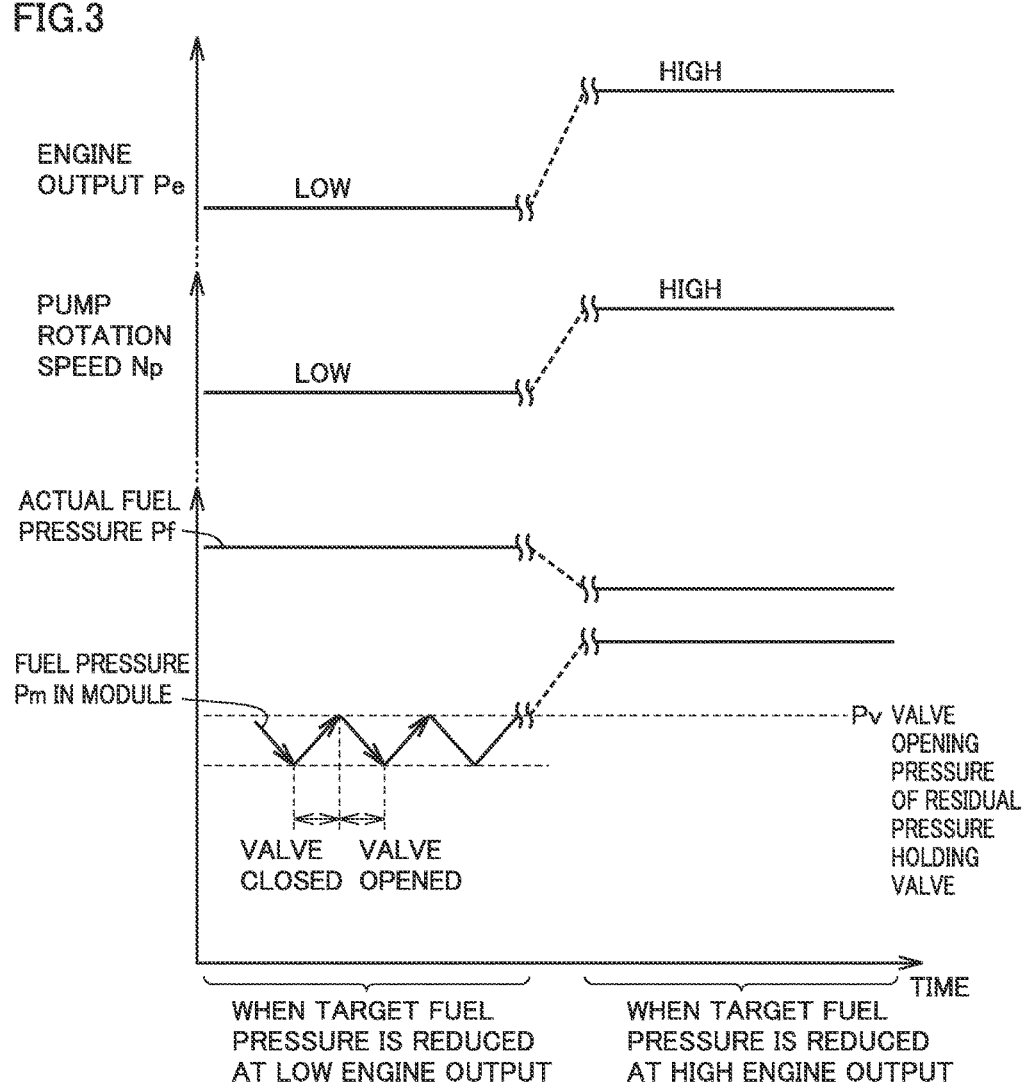
FIG. 3 is an operation waveform diagram for use in illustrating operation when noise is generated by the residual pressure holding valve.

In this case, noise may be generated by residual pressure holding valve 516. FIG. 3 is an operation waveform diagram for use in illustrating operation when noise is generated by the residual pressure holding valve.

Referring to FIG. 2 and a left-half section of FIG. 3, when an engine output Pe is relatively low, a rotation speed Np of feed pump 512 is also set low. In this state, if the target fuel pressure is reduced, engine ECU 141 causes the rotation speed of feed pump 512 to further decrease. Then, because engine output Pe is low, the amount of injected fuel is small, and the amount of fuel discharged from residual pressure holding valve 516 is greater than the amount of injected fuel. Hence, the amount of decrease in a fuel pressure Pm in fuel filter module 514 is larger than the amount of decrease in actual fuel pressure Pf in low-pressure delivery pipe 53 and low-pressure fuel pipe 52. Although the target fuel pressure (about 400 kPa) after the decrease is higher than a valve opening pressure Pv (for example, about 200 kPa), because of this difference in the amount of decrease, fuel pressure Pm in the module may cross a pressure near valve opening pressure Pv of residual pressure holding valve 516, before actual fuel pressure Pf matches the target fuel pressure after the decrease. Note that valve opening pressure Pv corresponds to the "first prescribed value" in the claims.

When fuel pressure Pm in the module is near valve opening pressure Pv of residual pressure holding valve 516, residual pressure holding valve 516 is repeatedly opened and closed. Residual pressure holding valve 516 is configured such that it does not assume a semi-open position. In the open position, fuel pressure Pm in the module decreases, and in the closed position, fuel pressure Pm in the module increases. As shown in a left-half waveform shown in FIG. 3, when residual pressure holding valve 516 is repeatedly opened and closed at short intervals, noise from residual pressure holding valve 516 may be audible to a passenger and a person near the vehicle. This generation of noise is preferably avoided.

First Embodiment

Thus, in the first embodiment, at the time of a request to reduce the target fuel pressure, the request is not permitted when the engine output is low, and is permitted when the engine output is high.

Referring to FIG. 2 and a right-half section of FIG. 3, when engine output Pe is relatively high, rotation speed Np of feed pump 512 is also set high. In this state, if the target fuel pressure is reduced, rotation speed Np of feed pump 512 decreases, but is still higher than that shown by the left-half waveform. Then, because engine output Pe is high, the amount of injected fuel is large, so that even though the fuel is discharged through residual pressure holding valve 516, check valve 517 is opened to supply the fuel to the fuel pipe.

In this state, actual fuel pressure Pf in low-pressure delivery pipe 53 and low-pressure fuel pipe 52 is equal to or lower than fuel pressure Pm in fuel filter module 514. Hence, fuel pressure Pm in the module can still be kept higher than the valve opening pressure of residual pressure holding valve 516 after actual fuel pressure Pf matches the reduced target fuel pressure.

Thus, the repeated opening and closing of residual pressure holding valve 516 does not occur.

Figure 4:
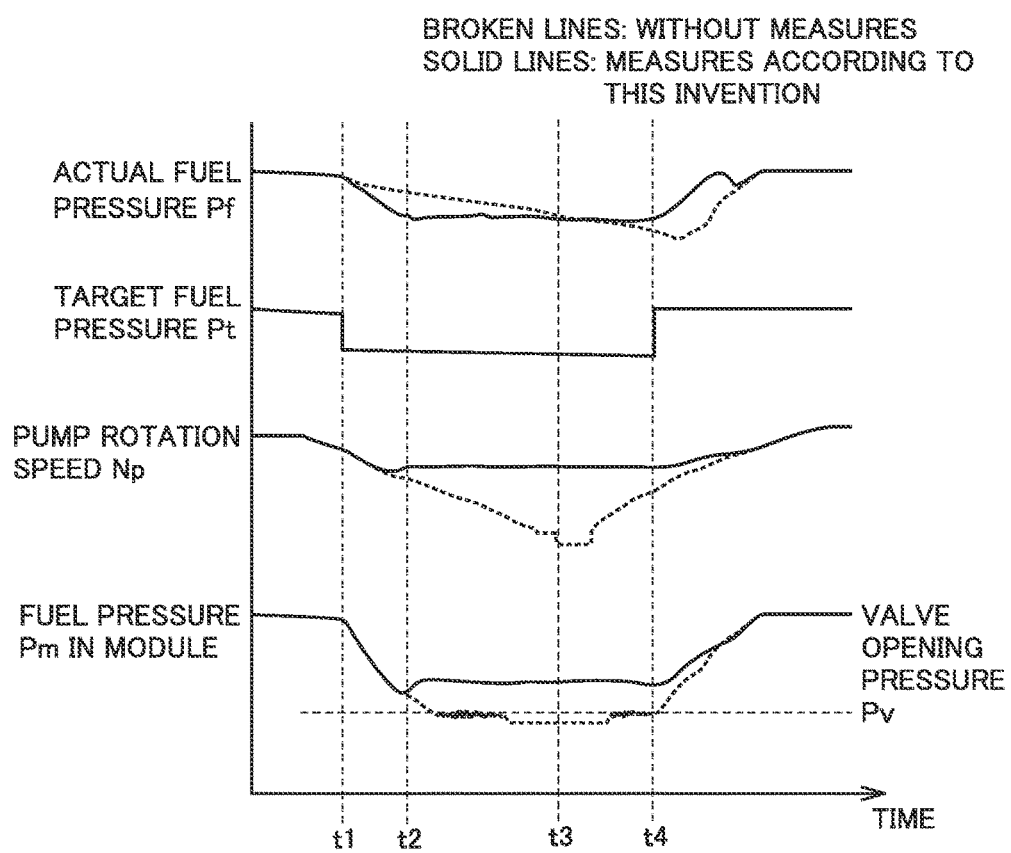
FIG. 4 is a waveform diagram showing waveforms when the target fuel pressure is reduced.

FIG. 4 is a waveform diagram showing waveforms when the target fuel pressure is reduced. In FIG. 4, the solid lines represent waveforms according to this embodiment, and the broken lines represent waveforms according to a referential example.

The referential example represented by the broken lines will be described first. At time t1, target fuel pressure Pt is reduced, and is returned to its original state at time t4. After the decrease in target fuel pressure Pt at time t1, it requires time for actual fuel pressure Pf to decrease. In this state, pump rotation speed Np continues being reduced until time t3 at which actual fuel pressure Pf matches target fuel pressure Pt.

As a result, fuel pressure Pm in the module decreases to near valve opening pressure Pv of the residual pressure holding valve, as shown by the broken line. Thus, the repeated opening and closing of residual pressure holding valve 516 occurs, resulting in generation of noise.

On the other hand, in this embodiment, target fuel pressure Pt is permitted to decrease only when the engine load is higher than a prescribed value. Thus, as shown by the solid lines, after target fuel pressure Pt is reduced at time t1, actual fuel pressure Pf is also rapidly reduced, and matches target fuel pressure Pt at time t2. At this time, pump rotation speed Np stops decreasing, so that fuel pressure Pm in the module does not decrease to near valve opening pressure Pv of residual pressure holding valve 516. From times t2 to t4, a state in which actual fuel pressure Pf is determined based on the amount of the fuel supplied from feed pump 512 continues stably. Thus, residual pressure holding valve 516 is maintained in the open position, without being repeatedly opened and closed.

FIG. 5 is a flowchart for use in illustrating control executed by control device 100 in the first embodiment. The processing in this flowchart is repeatedly executed for every prescribed control cycle.

Referring to FIGS. 2 and 5, in step S1, a request to reduce target fuel pressure Pt from A (kPa) to B (kPa) is issued in step S1. In one example, A=600 kPa, and B=400 kPa. This request is issued, for example, when the fuel pressure previously set higher than normal, for checking the operation of low-pressure fuel sensor 53a, is to be returned to the original fuel pressure, or when the fuel pressure previously set higher than normal, for suppressing evaporation of the fuel when the fuel in the fuel pipe is heated to a high temperature, is to be returned to the original fuel pressure.

It is then determined in step S2 whether or not engine load (Pe) is greater than prescribed power (CkW). In step S2, if Pe>C establishes (YES in S2), the processing proceeds to step S3, where the target fuel pressure is permitted to decrease and set to B (kPa).

On the other hand, if Pe>C does not establish in step S2 (NO in S2), the processing proceeds to step S4, where the target fuel pressure is not permitted to decrease, and is set to A (kPa) as previously without being changed.

After the target fuel pressure is determined in step S3 or S4, processing of determining the target fuel pressure ends in step S5.

As described above, in the first embodiment, processing of reducing the target fuel pressure is permitted only when the engine load is greater than the prescribed power. This avoids the decrease in fuel pressure Pm in the module to near valve opening pressure Pv as shown in the left-half section of FIG. 3, which can prevent the repeated opening and closing of residual pressure holding valve 516.

Second Embodiment

In the first embodiment, the target fuel pressure is reduced by waiting until the engine load exceeds the prescribed power. Thus, there is a possibility that a high target fuel pressure may be continued. Leaving the target fuel pressure unnecessarily high is undesired in that a loss may be produced in feed pump 512, leading to reduced fuel efficiency.

In the second embodiment, therefore, timing is created for allowing the target fuel pressure to decrease by increasing the engine load, while preventing a reduction in fuel efficiency. In the case of the hybrid vehicle as shown in FIG. 1, charging power (Pchg) for charging the battery is also reflected in engine power, separately from running power requested by the user with the accelerator pedal. In the second embodiment, therefore, at the time of a request to reduce the target fuel pressure, when the engine load does not exceed the prescribed power, the charging power is increased for charging the battery while increasing the engine load. In this way, the increase in engine load does not result in a loss, and the obtained power is stored in the battery as electrical energy.

FIG. 6 is a flowchart for use in illustrating control executed by engine ECU 141 in the second embodiment. The processing in this flowchart is repeatedly executed for every prescribed control cycle.

Referring to FIGS. 2 and 6, in step S1, a request to reduce target fuel pressure Pt from A (kPa) to B (kPa) is issued in step S1. In one example, A=600 kPa, and B=400 kPa. This request is issued, for example, when the fuel pressure previously set higher than normal, for checking the operation of low-pressure fuel sensor 53a, is to be returned to the original fuel pressure, or when the fuel pressure previously set higher than normal, for suppressing evaporation of the fuel when the fuel in the fuel pipe is heated to a high temperature, is to be returned to the original fuel pressure.

It is then determined in step S2 whether or not engine load (Pe) is greater than the prescribed power (CkW). Where Pe>C establishes in step S2 (YES in S2), the processing proceeds to step S3.

On the other hand, if Pe>C does not establish in step S2 (NO in S2), the processing proceeds to step S6. In step S6, the engine load is increased above CkW, and power corresponding to the increase is generated by motor generator 20, and an excess of the power is charged into battery 70. The processing in step S6 increases the amount of fuel injected, so that when target fuel pressure Pt is reduced, fuel pressure Pm in the module does not decrease prior to actual fuel pressure Pf decreases. Subsequent to the processing in step S6, processing in step S3 is executed.

In step S3, the target fuel pressure is permitted to decrease and set to B (kPa). After the target fuel pressure is determined in step S3, processing of determining the target fuel pressure ends in step S5.

As described above, in the second embodiment, at the time of a request to reduce target fuel pressure Pt to be lower than target fuel pressure Pt in a previous control cycle, when the load of engine 10 is smaller than the prescribed value (CkW), control device 100 performs the processing in step S6 in which target fuel pressure Pt is reduced after increasing the load of engine 10 above the prescribed value (CkW). Note that the prescribed value (CkW) corresponds to the "second prescribed value" in the claims.

Vehicle 1 includes battery 70 and motor generator 30. Thus, at the time of a request to reduce the target fuel pressure of the fuel supplied to feed pump 512 to be lower than the target fuel pressure in the previous cycle, control device 100 causes motor generator 30 to rotate and generate power using engine 10, and causes the generated power to be charged into battery 70, to thereby increase the load of engine 10 above the prescribed value (CkW).

Through the control as described above, when the load of engine 10 is smaller than the prescribed value (CkW), even at the time of a request to reduce target fuel pressure Pt, it is possible to reduce the fuel pressure as requested while avoiding generation of noise from residual pressure holding valve 516, by increasing the load of engine 10 without affecting running of the vehicle.

Third Embodiment

In the second embodiment, when the engine load is low, the engine load is increased before target fuel pressure Pt is reduced. It is, however, not always necessary to increase the engine load prior to reducing target fuel pressure Pt. The third embodiment describes an example in which target fuel pressure Pt is reduced before the engine load is increased.

In the third embodiment, when the load of engine 10 has become smaller than a prescribed value (DkW) by reducing the target pressure of the fuel to be supplied to feed pump 512 below the target pressure in the previous cycle, control device 100 causes the load of engine 10 to increase above the prescribed value (DkW). Note that the prescribed value (DkW) corresponds to the "third prescribed value" in the claims.

FIG. 7 is an operation waveform diagram for use in illustrating operation in the third embodiment. Referring to FIG. 7, from times t10 to t11, target fuel pressure Pt remains about 640 kPa, and actual fuel pressure Pf also matches target fuel pressure Pt.

At time t11, target fuel pressure Pt is reduced from about 640 kPa to about 400 kPa, which causes pump rotation speed Np to decrease, and fuel pressure Pm in the module to also decrease. Actual fuel pressure Pf decreases slowly, however, because the amount of injected fuel is not very large. If this state continues, pump rotation speed Np continues decreasing until time t13, as shown by the broken line. This reduces fuel pressure Pm in the module to near valve opening pressure Pv, resulting in generation of noise due to the repeated opening and closing of residual pressure holding valve 516.

Thus, in this embodiment, in response to decrease of engine output Pe to DkWa at t12, a charge command Pchg is set ON to increase engine output Pe to increase the amount of injected fuel. Actual fuel pressure Pf is then rapidly caused to match target fuel pressure Pt after time t12, as shown by the solid waveform, and pump rotation speed Np also stops decreasing. Thus, from times t12 to t13, fuel pressure Pm in the module does not decrease to near valve opening pressure Pv of residual pressure holding valve 516. From times t12 to t13, a state in which actual fuel pressure Pf is determined based on the amount of the fuel supplied from feed pump 512 continues stably. Thus, residual pressure holding valve 516 is maintained in the open position, without being repeatedly opened and closed.

FIG. 8 is a flowchart for use in illustrating control executed by control device 100 in the third embodiment. The processing in this flowchart is repeatedly executed for every prescribed control cycle.

Referring to FIGS. 2 and 8, in step S11, control device 100 determines whether or not it is the time to reduce target fuel pressure Pt. If it is not the time to reduce the target fuel pressure in step S11 (NO in S11), the processing in this flowchart ends. On the other hand, if it is the time to reduce the target fuel pressure in step S11 (YES in S11), the processing proceeds to step S12.

In step S12, it is determined whether or not the load of engine 10 is smaller than the prescribed power (DkW, where D<C). If Pe<D does not establish in step S12 (NO in S12), the processing in this flowchart ends. On the other hand, if Pe<D establishes in step S12 (YES in S12), the processing proceeds to step S13.

In step S13, the engine load is increased, and power is generated by motor generator 20, and the generated power is charged into battery 70.

As described above, in the third embodiment, at the time of the processing of reducing the target fuel pressure, when the engine load is smaller than the prescribed power, the processing of increasing the engine load while reducing the target fuel pressure is executed by performing charging processing. This avoids the decrease in fuel pressure Pm in the module to near valve opening pressure Pv as shown in the left-half section of FIG. 3, which can prevent the repeated opening and closing of residual pressure holding valve 516.

While embodiments of the present disclosure have been described as above, it should be understood that the embodiments disclosed herein are illustrative and non-restrictive in every respect. The scope of the present disclosure is defined by the terms of the claims, rather than the description above, and is intended to include any modifications within the scope and meaning equivalent to the terms of the claims.

What is claimed is:

1. A control device for a vehicle,
    the vehicle including an internal combustion engine having a fuel injection valve, a fuel tank that stores a fuel to be injected from the fuel injection valve, an electric feed pump that sucks the fuel from the fuel tank and supplies the fuel to the fuel injection valve, and a holding valve provided downstream the electric feed pump to hold a pressure in a fuel pipe leading to the fuel injection valve,
    the holding valve being configured to be opened to return the fuel in the fuel pipe to the fuel tank when the pressure in the fuel pipe exceeds a first prescribed value, and to be closed when the pressure in the fuel pipe is lower than the first prescribed value, and
    at the time of a request to reduce a target pressure of the fuel supplied by the electric feed pump, when a load of the internal combustion engine is small, the control device being configured to make a reduction width of the target pressure smaller than a reduction width of the target pressure when the load of the internal combustion engine is great.

2. The control device for a vehicle according to claim 1, wherein
    the control device is configured to refrain from causing the target pressure to decrease when the load of the internal combustion engine is smaller than a second prescribed value, and cause the target pressure to decrease when the load of the internal combustion engine is greater than the second prescribed value to thereby reduce the reduction width of the target pressure.

3. The control device for a vehicle according to claim 2, wherein
the vehicle further includes a power storage device and a power generator, wherein
at the time of a request to reduce a target pressure of the fuel to be supplied to the electric feed pump, when the load of the internal combustion engine is smaller than the second prescribed value, the control device is configured to increase the load of the internal combustion engine by causing power generated by the power generator driven with the internal combustion engine to be charged into the power storage device.

4. The control device for a vehicle according to claim 1, wherein
the vehicle further includes a first check valve provided between the holding valve and the electric feed pump in the fuel pipe, and
the holding valve is configured to be closed when injection of the fuel from the fuel injection valve is stopped and operation of the electric feed pump is stopped, to hold a pressure downstream the first check valve around the first prescribed value.

5. The control device for a vehicle according to claim 4, wherein
the vehicle further includes a second check valve provided between the fuel injection valve and the holding valve, and
the second check valve is configured to be opened when a pressure in the vicinity of the holding valve is higher than a pressure in the vicinity of the fuel injection valve, and to be closed when the pressure in the vicinity of the holding valve is lower than the pressure in the vicinity of the fuel injection valve.

6. A control device for a vehicle,
the vehicle including an internal combustion engine having a fuel injection valve, a fuel tank that stores a fuel to be injected from the fuel injection valve, an electric feed pump that sucks the fuel from the fuel tank and supplies the fuel to the fuel injection valve, and a holding valve provided downstream the electric feed pump to hold a pressure in a fuel pipe leading to the fuel injection valve,
the holding valve being configured to be opened to return the fuel in the fuel pipe to the fuel tank when the pressure in the fuel pipe exceeds a first prescribed value, and to be closed when the pressure in the fuel pipe is lower than the first prescribed value, and
at the time of a request to reduce a target pressure of the fuel supplied by the electric feed pump, when a load of the internal combustion engine is smaller than a third prescribed value, the control device being configured to reduce the target pressure while performing processing of increasing the load of the internal combustion engine.

7. A vehicle comprising:
an internal combustion engine having a fuel injection valve;
a fuel tank that stores a fuel to be injected from the fuel injection valve;
an electric feed pump that sucks the fuel from the fuel tank and supplies the fuel to the fuel injection valve;
a holding valve provided downstream the electric feed pump to hold a pressure in a fuel pipe leading to the fuel injection valve, the holding valve configured to be opened to return the fuel in the fuel pipe to the fuel tank when the pressure in the fuel pipe exceeds a first prescribed value, and to be closed when the pressure in the fuel pipe is lower than the first prescribed value; and
an electronic control unit configured to, at the time of a request to reduce a target pressure of the fuel supplied by the electric feed pump, when a load of the internal combustion engine is small, make a reduction width of the target pressure smaller than a reduction width of the target pressure when the load of the internal combustion engine is great.

8. The vehicle according to claim 7, wherein
the electronic control unit is configured to refrain from causing the target pressure to decrease when the load of the internal combustion engine is smaller than a second prescribed value, and cause the target pressure to decrease when the load of the internal combustion engine is greater than the second prescribed value to thereby reduce the reduction width of the target pressure.

9. The vehicle according to claim 8 further comprising:
a power storage device; and
a power generator,
wherein at the time of a request to reduce a target pressure of the fuel to be supplied to the electric feed pump, when the load of the internal combustion engine is smaller than the second prescribed value, the electronic control unit is configured to increase the load of the internal combustion engine by causing power generated by the power generator driven with the internal combustion engine to be charged into the power storage device.

10. The vehicle according to claim 7 further comprising:
a first check valve provided between the holding valve and the electric feed pump in the fuel pipe,
wherein the holding valve is configured to be closed when injection of the fuel from the fuel injection valve is stopped and operation of the electric feed pump is stopped, to hold a pressure downstream the first check valve around the first prescribed value.

11. The vehicle according to claim 10 further comprising:
a second check valve provided between the fuel injection valve and the holding valve,
wherein the second check valve is configured to be opened when a pressure in the vicinity of the holding valve is higher than a pressure in the vicinity of the fuel injection valve, and to be closed when the pressure in the vicinity of the holding valve is lower than the pressure in the vicinity of the fuel injection valve.

* * * * *